3,847,974
CONTINUOUS PRODUCTION OF
ANTHRANILIC ACID
Hans-Juergen Sturm, Gruenstadt, Fritz Erdmann Kempter, Frankenthal, and Herbert Armbrust, Gruenstadt, Germany, assignors to Badische Anilin- & Soda-Fabrik Aktiengesellschaft, Ludwigshafen (Rhine), Germany
No Drawing. Filed Oct. 6, 1970, Ser. No. 78,622
Int. Cl. C07c 101/54
U.S. Cl. 260—518 R          9 Claims

ABSTRACT OF THE DISCLOSURE

Continuous production of anthranilic acid and isatoic anhydride by reaction of alkali metal salts of phthalamic acid and/or phthalimic acid with hypohalites, the first stages being carried out substantially adiabatically and these these first stages as well as the supply of reaction mixture if these stages being effected in such a way that backmixing is substantially avoided, a reducing agent being advantageously added to the reaction mixture after the latter has left the reaction zone of the first stages and before the reaction has been completed. The compounds obtainable by the process according to the invention are valuable starting materials for the production of dyes and odorants.

---

This invention relates to a process for the continuous production of anthranilic acid and isatoic anhydride by reacting alkali metal salts of phthalamic acid and/or phthalimic acid, the first stages being carried out substantially adiabatically and these first stages as well as the supply of reaction mixture in these stages being effected in such a way that backmixing is substantially avoided, a reducing agent being advantageously added to the reaction mixture after the latter has left the reaction zone of the first stages and before the reaction has been completed.

It is known from German Patent 1,224,748 that alkali metal salts of phthalamic acid can be continuously reacted to form anthranilic acid by oxidation with alkali metal hypochlorite. The starting materials in the form of their cooled aqueous solutions are mixed in a cooled mixing chamber and reacted in the first stage, which comprises the formation of phenyl isocyanate-2-carboxylic acid, in that portion of a reaction column which is equipped with a cooling system. In the second stage, which comprises the formation of anthranilic acid, the reaction temperature should not exceed 70° C. The description emphasizes the importance of removing the heat of reaction by cooling, especially in the first stage, a maximum temperature of +10° C. being indicated for the formation of phenyl isocyanate-2-carboxylic acid. Even in batchwise operation great importance has hitherto been attached to good cooling.

German Printed Application 1,287,580 describes the production of isatoic anhydride by reacting phthalimide with a hypohalite. Phthalimide is used in the form of the aqueous solution of its salt with a base; the hypohalite is added before 50% of the phthalimide in the solution is hydrolyzed. After addition of the halite solution 18,000 to 30,000 gram calories are set free in the reaction solution, and then the solution is adjusted to a pH value of from 5.5 to 9.

It is an object of the present invention to provide a new process for the continuous production of anthranilic acid and isatoic anhydride in a simpler and more economical way, in good yield and high purity, in a much higher space-time yield, and with increased reliability in operation.

We have found that this object is achieved and the continuous production of anthranilic acid and/or isatoic anhydride by reaction of alkali metal salts of phthalamic acid and/or phthalimic acid with hypohalites in an aqueous medium is advantageously carried out by effecting the first reaction stages, i.e. the reaction of the starting material to form the alkali metal salt of phenyl isocyanate-2-carboxylic acid, under substantially adiabatic conditions while substantially avoiding the occurrence of backmixing, and immediately withdrawing the reaction mixture formed from the reaction zone of the first stages and supplying it substantially without backmixing to the reaction zone of the following stages, i.e. the reaction to form the end product.

It is advantageous to add a reducing agent to the reaction mixture after the latter has left the reaction zone of the first stages and before the reaction has been completed.

If sodium salts and sodium hypochlorite are used, the reaction may be represented by the following formulae:

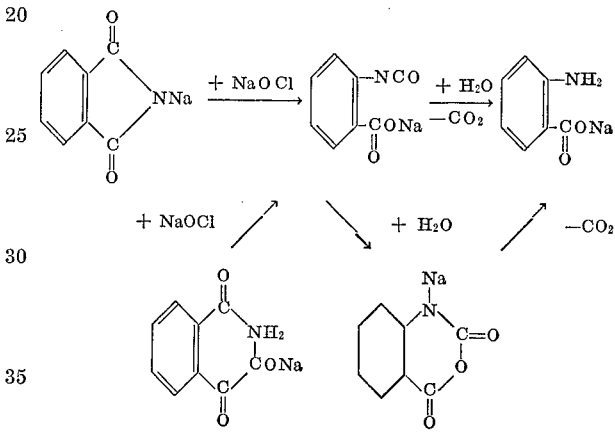

As compared with the prior art processes, the process according to this invention gives anthranilic acid and/or isatoic anhydride in a simpler and more economical way, in good yield and high purity and in a much higher space-time yield. In view of the state of the art it is surprising that the said advantageous results are obtained with the first reaction stages being carried out under substantially adiabatic conditions, i.e. without using a cooling system. It is both an essential feature and an advantage of the process of the invention that the heat of reaction formed is not or substantially not removed; all cooling measures are therefore dispensed with. Plants using the process according to this invention are consequently much simpler and more reliable in operation. It is also surprising that in the case of the production of isatoic anhydride by the process according to this invention good results are obtained even if the hydrolysis of phthalimide and/or the adjustment of the pH value is not effected under the conditions claimed in German Printed Application 1,287,580.

The above-mentioned embodiment of the process, in which a reducing agent is added to the reaction mixture after the latter has left the reaction zone of the first stages and before the reaction has been completed, is preferred. Reliability in operation is increased, since the reaction is carried out without loss in yield even at temperatures of from 80° to 100° C. in the last reaction stage, i.e. the reaction of phenyl isocyanate-2-carboxylic acid to form anthranilic acid. These advantageous results are obtained even if uniform metering of the starting solutions is not strictly observed. An excess of hypochlorite does not influence the result to any great extent. Nor do fluctuations in the concentration of ammonia (solution of the alkali metal salt of phthalimic or phthalamic acid) or sodium chlorate (hypochlorite solution) play any important part as regards the yield and purity (coloration) of the end product. Consequently the formation of sodium chlorate or other oxidizing byproducts, which may occur in the first stages of the reaction, does not influence to any great extent the amount or coloration of the anthranilic acid formed.

The starting materials are alkali metal salts of phthalamic acid and/or phthalimic acid and hypohalites in an aqueous medium, usually in the form of aqueous solutions of 10 to 50% by weight of phthalimide and/or phthalamide which contain from 1 to 1.1 mole of alkali metal hydroxide per mole of phthalimide/phthalamide. Sodium hydroxide and potassium hydroxide are preferred.

The aqueous hypohalite solutions advantageously contain 8 to 15% by weight of hypohalite and from 0 to 3, preferably from 0.02 to 2.1, moles of alkali metal hydroxide per mole of phthalimic acid/phthalamic acid. Preferred hypohalites are hypochlorites, particularly alkali metal hypochlorites, e.g. the sodium and potassium salts, and alkaline earth metal hypochlorites, e.g. the calcium salt. In general the reaction is carried out using such an amount of hypohalite that 1 to 1.3 moles of active chlorine is available per mole of phthalimide and/or phthalamide.

The formation of the end product is influenced by adjusting the alkali concentration of the starting solutions. If 0.9 to 1.1 mole of alkali per mole of phthalimic acid and/or phthalamic acid is used in the starting solution, isatoic anhydride is obtained.

The invention is based on the discovery that the reaction is advantageously carried out in reaction zones in which the reaction proceeds at the same rate, while substantially avoiding the occurrence of backmixing in all zones and ensuring that the reaction takes place under substantially adiabatic conditions in the first stages. The reaction is effected in two steps, the first reaction stages comprising the reaction of the starting material via the alkali metal salt of N-chlorophthalamic acid to form the alkali metal salt of phenyl isocyanate-2-carboxylic acid and the following stages comprising the reaction of the alkali metal salt to form isatoic anhydride and/or anthranilic acid. The first reaction stages are carried out under substantially adiabatic conditions; as a result of the heat of reaction formed, the temperature of the reaction mixture usually rises to from 20° to 40° C. It is advantageous to mix the starting materials in the form of their aqueous alkaline solutions having the above-mentioned concentrations in the appropriate relative proportions by means of suitable mixing equipment, e.g. mixing nozzles or vessels equipped with high-speed stirrers. The reaction mixture is supplied from the mixing unit into the reaction zone of the first reaction stages, which advantageously consists of a narrow reaction tube, and from there, after having been reacted, into the reaction zone of the following stages. The mixing unit, the reaction zone of the first stages and the solutions of the starting materials need not be cooled. Another essential feature of the process according to this invention is the substantial suppression of backmixing in the reaction zone of the first stages, the rapid removal of the reaction mixture from the zone of the first stages and its supply to the following stages while substantially avoiding the occurrence of backmixing.

It is advantageous to impart to the reaction mixture a high flow velocity by using a reaction tube of small diameter in the first stages and appropriate pumps. Examples of suitable pumps are jet, rotary, rotary-piston, eccentric, impeller, centrifugal, axial and propeller pumps. In a preferred embodiment of the process according to this invention the flow velocity is determined by the diameter and length of the reaction tube. For example, at a cross-sectional area of the reaction tube of 12 mm.$^2$, flow velocities of from 0.2 to 3 m./sec., preferably from 0.5 to 1 m./sec., are advantageously used. When these velocities are employed, substantially all of the starting material is reacted in the first stages, during a residence time of from 20 to 40 seconds, via the phthalic acid monoamide chlorinated at the phenyl isocyanate-2-carboxylic acid. Owing to the high flow velocity the alkali metal salt formed is immediately removed from the reaction zone of the first stages and supplied to the following stage, where it is reacted to give anthranilic acid and/or isatoic anhydride, usually with a residence time of from 20 to 150 seconds. Moreover, the high flow velocity substantially prevents backmixing throughout the reaction. In particular, backmixing of the end product with the reaction mixture of the first stages as well as backmixing of the reaction mixtures in the individual first stages with each other is avoided and consequently the formation of byproducts by reaction of the hypohalite or the N-chlorinated phthalic acid monoamide with the end product or by similar reactions in the mixtures of the first stages is suppressed. The reaction in the first stages is usually carried out at a temperature of from 10° to 50° C., preferably from 20° to 40° C., that in the following stages at from 60° to 80° C.; either atmospheric or superatmospheric pressure may be used. At the end of the sequence of reactions the reaction mixture is withdrawn; it can be further processed as an alkaline solution of the end product, e.g. of the anthranilic acid, since the end product is obtained in high purity. Isolation of the end product from the alkaline solutions may be effected by precipitation with acid, e.g. hydrochloric acid or sulfuric acid, followed by filtration.

The reaction according to the preferred embodiment of the process may be carried out using any of a large number of reducing agents which are soluble in, or miscible with, water and/or alkalies. Examples of suitable reducing agents are hydrides such as sodium borohydride and lithium triethoxy aluminum hydride; reducing sulfur compounds such as sodium sulfide, sodium hydrogen sulfide, ammonium sulfide, sulfurous acid, sulfur dioxide, sodium dithionite, sodium thiosulfate, sodium formaldehyde sulfoxylate and thiourea dioxide; hydrazine and its salts, e.g. the sulfate or chloride; and glucose. Preferred reducing agents are sodium sulfite and sodium bisulfite. The reducing agent may be used in the stoichiometric amount or in excess with reference to the hypohalite added. It is advantageous to use an aqueous solution of the reducing agent, e.g. a 10 to 40 wt. percent aqueous sodium bisulfite solution.

Addition of the reducing agent to the reaction mixture may be caried out batchwise or preferably continuously downstream of the first stages and upstream of the end of the last stage. The reducing agent may be added at a plurality of points or preferably at one point during the reaction of phenyl isocyanate-2-carboxylic acid, formed in the first stages of the reaction, to give anthranilic acid, advantageously immediately after completion of the reaction of the starting material to give phenyl isocyanate-2-carboxylic acid. Completion of the first reaction stages can usually be recognized by a rise in temperature from 20°-30° C. to about 60°-65° C. The rate of addition is normally governed by the flow velocity of the reaction mixture; the concentration of the solution added and the above-mentioned ratio of reducing agent to hypohalite have also to be taken into consideration. Metering of the reducing solution may be effected in any way via a chamber equipped with a stirrer, via a mixing nozzle or preferably via a mixing cell.

In general the reaction is carried out using such an amount of hypohalite that 1 to 2, preferably 1.8 to 1.9, moles of active chlorine is available per mole of phthalimide and/or phthalamide. In all other respects this embodiment is carried out under the same conditions as indicated above, especially with regard to the starting materials and starting solutions, the reaction zones in which the reaction proceeds at the same rate, backmixing being substantially prevented and substantially adiabatic conditions being used in the first stages, the reaction temperatures in all stages, the mixing means and the use of suitable reaction tubes. After addition of the reducing agent the reaction may be carried out in the reaction tube at a high flow velocity, e.g. at from 0.2 to 3 m./sec., or in a reaction chamber of any size and shape without loss in yield. Cross-sectional area, flow velocity and temperature of the starting solutions usualy determine the length of the tube in which the first reaction stages are carried out. For example, the first stages of the reaction are usually completed after 20 to 24 m. if the cross-sectional area of the tube is 12 mm.$^2$, the flow velocity 0.5 to 1 m./sec. and the temperature of the starting solutions is 20° to 25° C. The reducing agent is advantageously added immediately afterwards.

The compounds obtainable by the process according to this invention are valuable starting materials for the production of dyes and odorants. Isatoic anhydride can be converted into anthranilic acid by saponification with alkali. Regarding the use of these products reference is made to the patents indicated above and to Ullmanns Encyklopädie der technischen Chemie, volume 3, pages 465 ff., and volume 13, page 499.

The invention is further illustrated by the following Examples, in which parts are by weight unless otherwise stated. Parts by weight bear the same relation to parts by volume as the kilogram to the liter.

Example 1

Use is made of a stainless-steel apparatus consisting of a mixing nozzle and a reaction tube 45 m. in length and 4 mm. in internal diameter.

A phthalimide solution consisting of 1,470 parts of phthalimide, 578 parts by volume of 50 wt. percent aqueous caustic soda solution and 8000 parts by volume of water is mixed in the mixing nozzle with a sodium hypochlorite solution consisting of 4,080 parts of sodium hypochlorite solution (13.8 wt. percent of active chlorine), 745 parts by volume of 50 wt. percent aqueous caustic soda solution and 400 parts by volume of water in a ratio of 14:7.75 parts by volume at room temperature.

The flow velocity in the reaction tube is 0.56 m./sec. and the residence time is about 80 seconds. The mixture is reacted in the first part of the reaction tube (about 13 to 15 m.) under substantially adiabatic conditions, the temperature in the remaining reaction space rising to 68°–72° C. Per hour 2.58 parts of phthalimide are reacted. The reaction mixture is adjusted to pH 4.5 with sodium bisulfite solution and hydrochloric acid, cooled and suction filtered and the filter residue is washed with water and dried.

2.25 parts (90% of the theory) of anthranilic acid (99%) having a melting point of 143°–145° C. is obtained per hour, the space/time yield being 4 parts per hour per liter.

Example 2

A stainless-steel reactor having a length of 100 m. and an internal diameter of 4 mm. is used.

A phthalimide solution consisting of 1470 parts of phthalimide, 530 parts by volume of 50 wt. percent aqueous caustic soda solution and 12,350 parts by volume of water is mixed in a mixing nozzle with a sodium hypochlorite solution consisting of 4080 parts of sodium hypochlorite solution (13.8% by weight of active chlorine) and 10,330 parts by volume of water in a ratio of 13.4:8.6 parts by volume at 20° C.

The flow velocity in the reaction tube is 0.57 m./sec., the residence time being about 175 seconds.

Analogously to Example 1, the mixture is reacted under substantially adiabatic conditions. 1.686 parts of phthalimide is reacted per hour. The reaction mixture is adjusted to pH 7 with sulfuric acid and suction filtered and the filter residue is washed with water and dried.

1.57 parts (84% of the theory) of isatoic anhydride (97%) is obtained per hour. The space/time yield is 1.25 part per hour per liter.

Example 3

Use is made of a stainless-steel apparatus consisting of a mixing nozzle and a reaction tube having a length of 45 m. and an internal diameter of 4 mm. A second mixing nozzle is arranged 22.5 m. downstream of the first one.

A phthalimide solution consisting of 1470 parts of phthalimide, 578 parts by volume of 50 wt. percent aqueous caustic soda solution and 8000 parts by volume of water is mixed in the first mixing nozzle with a sodium chlorite solution consisting of 4080 parts of sodium hypohypochlorite solution consisting of 4080 parts of sodium hypochlorite solution (13.8% by weight of active chlorine), 745 parts by volume of 50 wt. percent aqueous caustic soda solution and 400 parts by volume of water in a ratio of 14.0:7.75 parts by volume at room temperature. After a tube length of 22.5 m. and a residence time of 28 to 29 seconds 0.9 part by volume of a 10 wt. percent aqueous sodium bisulfite solution is added to the reaction mixture via the second mixing nozzle.

The flow velocity in the first reaction stages in the reaction tube (up to 20.5 m.) is 0.72 m./sec. and in the last reaction stage after the addition of the reducing agent 0.74 m./sec., the total residence time being 62.0 seconds. The mixture is reacted in the first stages under substantially adiabatic conditions, the temperature in the remaining reaction space rising to from 68° to 72° C. 3.25 parts of phthalimide is reacted per hour. The reaction mixture is adjusted to pH 4.3 with hydrochloric acid, cooled and suction filtered and the filter residue is washed with water and dried.

2.925 parts (90% of the theory) of anthranilic acid having a melting point of 143° to 145° C. is obtained per hour, the space/time yield being 5.20 parts per hour per liter.

We claim:

1. A process for the continuous production of anthranilic acid which comprises reacting a starting compound selected from the group consisting of the alkali metal salts of phthalamic acid and phthalimic acid in an aqueous medium in a plurality of stages, the first reaction stages for converting the starting compound into the alkali metal salt of phenyl isocyanate-2-carboxylic acid being carried out under substantially adiabatic conditions while substantially avoiding any backmixing, the resulting reaction mixture being immmediately withdrawn from the reaction zone of said first stages and then supplied substantially without backmixing to the reaction zone of at least one subsequent stage for hydrolysis and decarboxylation of said phenyl isocyanate-2-carboxylic acid into anthranilic acid, a reducing agent selected from the group consisting of sodium borohydride, lithium triethoxy aluminum hydride, sodium sulfide, sodium hydrogen sulfide, ammonium sulfide, sulfurous acid, sulfur dioxide, sodium dithionite, sodium thiosulfate, sodium formaldehyde sulfoxylate, thiourea dioxide, hydrazine and its salts, glucose, sodium sulfite and sodium bisulfite being added to the reaction mixture withdrawn from the reaction zone of said first stages and before the reaction has been completed.

2. A continuous process as claimed in claim 1 wherein the reaction in the first stages is carried out in a reaction tube at a flow velocity of from 0.2 to 3 meters/second and within a residence time of about 20 to 40 seconds and the reaction in the subsequent stage or stages is carried out within a residence time of about 20 to 150 seconds.

3. A continuous process as claimed in claim 2 wherein the reaction in the first stages is carried out at a temperature of about 20° C. to 60° C. and the reaction in the subsequent stage or stages is carried out at temperatures of from about 60° C. to 80° C.

4. A process as claimed in claim 1 wherein said reducing agent is sodium sulfite or sodium bisulfite.

5. A process as claimed in claim 1 wherein the reaction is carried out using aqueous hypohalite solutions containing 8 to 15% by weight of hypohalite and 0.02 to 2.1 moles of alkali metal hydroxide per mole of phthalimic acid and/or phthalamic acid.

6. A process as claimed in claim 1 wherein the reaction in the first stages is carried out at a temperature of from 10° to 50° C.

7. A process as claimed in claim 1 wherein the reaction is carried out at a temperature of from 20° to 40°.

8. A process as claimed in claim 1 wherein the reaction in the second stage is carried out at a temperature of from 60° to 80° C.

9. A process as claimed in claim 1 wherein the reaction is carried out using a 10 to 40 wt. percent aqueous sodium bisulfite solution as reducing agent.

References Cited

UNITED STATES PATENTS 3,324,119   6/1967   Hill et al. _____ 260—244 A

LORRAINE A. WEINBERGER, Primary Examiner

L. A. THAXTON, Assistant Examiner

U.S. Cl. X.R.

260—244 A

UNITED STATES PATENT OFFICE
CERTIFICATE OF CORRECTION

PATENT NO. : 3,847,974
DATED : November 12, 1974
INVENTOR(S) : Hans-Juergen Sturm et al.

It is certified that error appears in the above-identified patent and that said Letters Patent are hereby corrected as shown below:

In the Heading, after line 8, insert --Claims priority, application Germany, October 6, 1969 & January 8, 1970, P 19 50 281.9 & P 20 00 698.8--

In Column 4, Line 46, delete "caried" and substitute --carried--

Signed and Sealed this

Twentieth Day of July 1976

[SEAL]

*Attest:*

RUTH C. MASON
*Attesting Officer*

C. MARSHALL DANN
*Commissioner of Patents and Trademarks*